(12) United States Patent
Sarh et al.

(10) Patent No.: US 8,695,190 B2
(45) Date of Patent: Apr. 15, 2014

(54) ELECTROMAGNETIC CRAWLER ASSEMBLY SYSTEM

(75) Inventors: Branko Sarh, Huntington Beach, CA (US); David Hassan Amirehteshami, Los Alamitos, CA (US)

(73) Assignee: The Boeing Company, Chicago, IL (US)

( * ) Notice: Subject to any disclaimer, the term of this patent is extended or adjusted under 35 U.S.C. 154(b) by 766 days.

(21) Appl. No.: 12/838,616

(22) Filed: Jul. 19, 2010

(65) Prior Publication Data

US 2012/0014759 A1    Jan. 19, 2012

(51) Int. Cl.
 *B25B 27/14*    (2006.01)
(52) U.S. Cl.
 USPC ............... 29/281.1; 29/283; 29/429; 29/565; 180/8.1; 180/8.5; 180/164; 414/735; 414/749.1
(58) Field of Classification Search
 USPC .......... 29/50–56.56, 429, 428, 430, 431, 565, 29/283, 407.09, 281.1; 180/8.1, 8.5, 8.6, 180/164; 414/749.1, 735
 See application file for complete search history.

(56) References Cited

U.S. PATENT DOCUMENTS

| | | | | |
|---|---|---|---|---|
| 4,345,658 A | * | 8/1982 | Danel et al. .................... | 180/8.5 |
| 4,667,998 A | * | 5/1987 | Borcea et al. ................. | 294/203 |
| 4,674,949 A | * | 6/1987 | Kroczynski ............... | 414/749.1 |
| 5,429,009 A | | 7/1995 | Wolfe et al. | |
| 6,536,100 B2 | | 3/2003 | Sarh et al. | |
| 8,377,044 B2 | * | 2/2013 | Coe et al. ........................ | 606/1 |

FOREIGN PATENT DOCUMENTS

| | | |
|---|---|---|
| DE | 10318490 A1 | 11/2004 |
| EP | 0010034 A1 | 4/1980 |
| EP | 1884453 A2 | 2/2008 |
| JP | 1036587 A | 2/1989 |
| WO | WO2012012034 A2 | 1/2012 |

OTHER PUBLICATIONS

Sarh, "Universal Splicing Machine", Presented at WESTEC 2004, Los Angeles, Mar. 23, 2004, pp. 1-12.
PCT search report dated Mar. 27, 2012 regarding application PCT/US2011/040033 (3 pages).

* cited by examiner

*Primary Examiner* — Richard Chang
(74) *Attorney, Agent, or Firm* — Yee & Associates, P.C.

(57) ABSTRACT

A method and an apparatus for performing operations on a workpiece is provided. A first frame in a frame system may be held on the workpiece by applying a vacuum to the first frame. A second frame in the frame system may be detached from the workpiece by applying a pressure to the second frame. The second frame may be moved to a location on the workpiece. The second frame may be attached to the workpiece by applying the vacuum to the second frame. An operation may be performed on the workpiece.

18 Claims, 13 Drawing Sheets

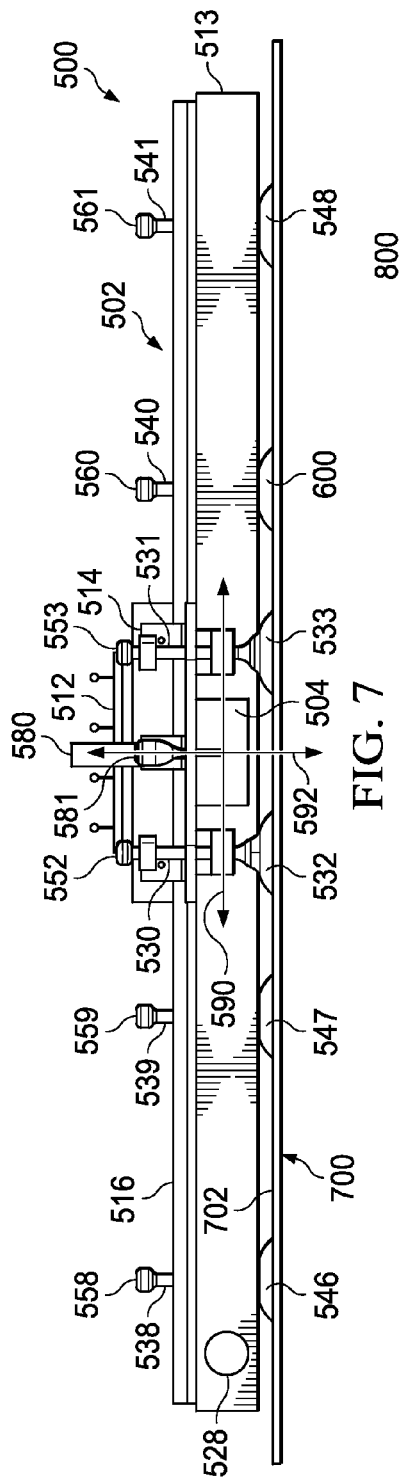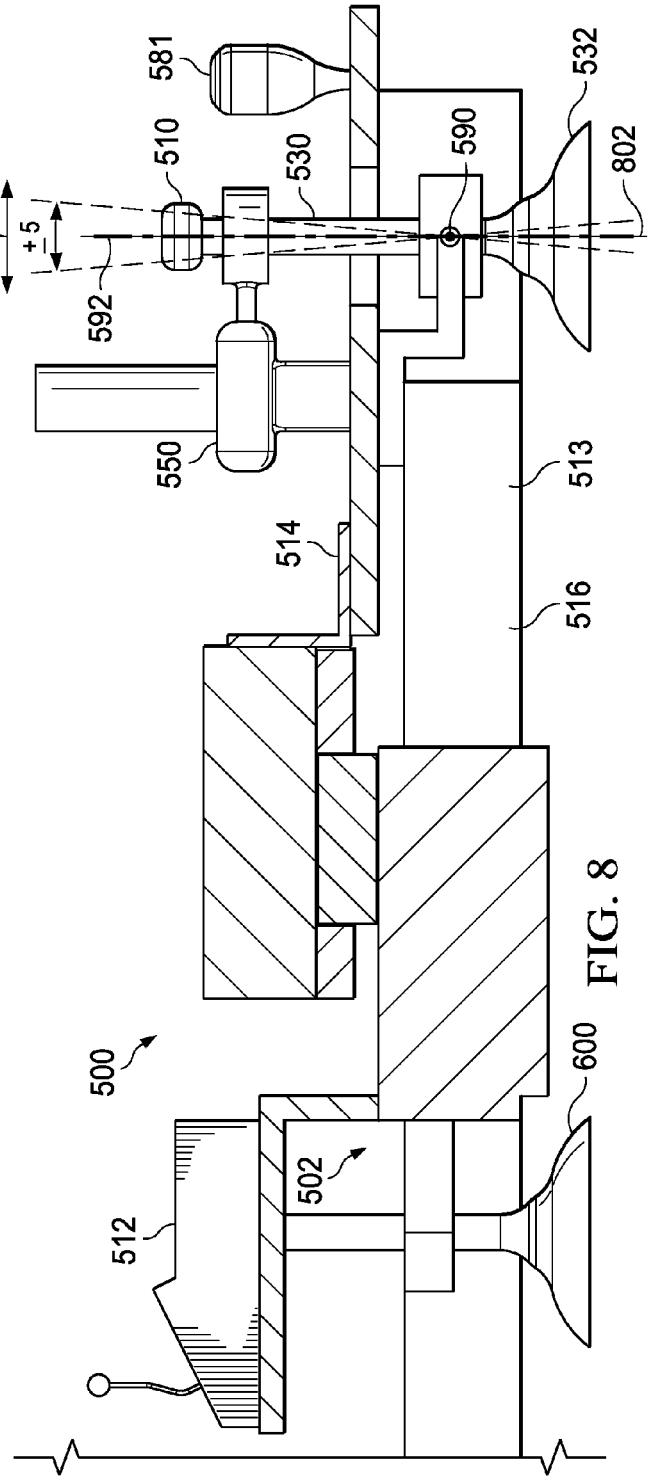

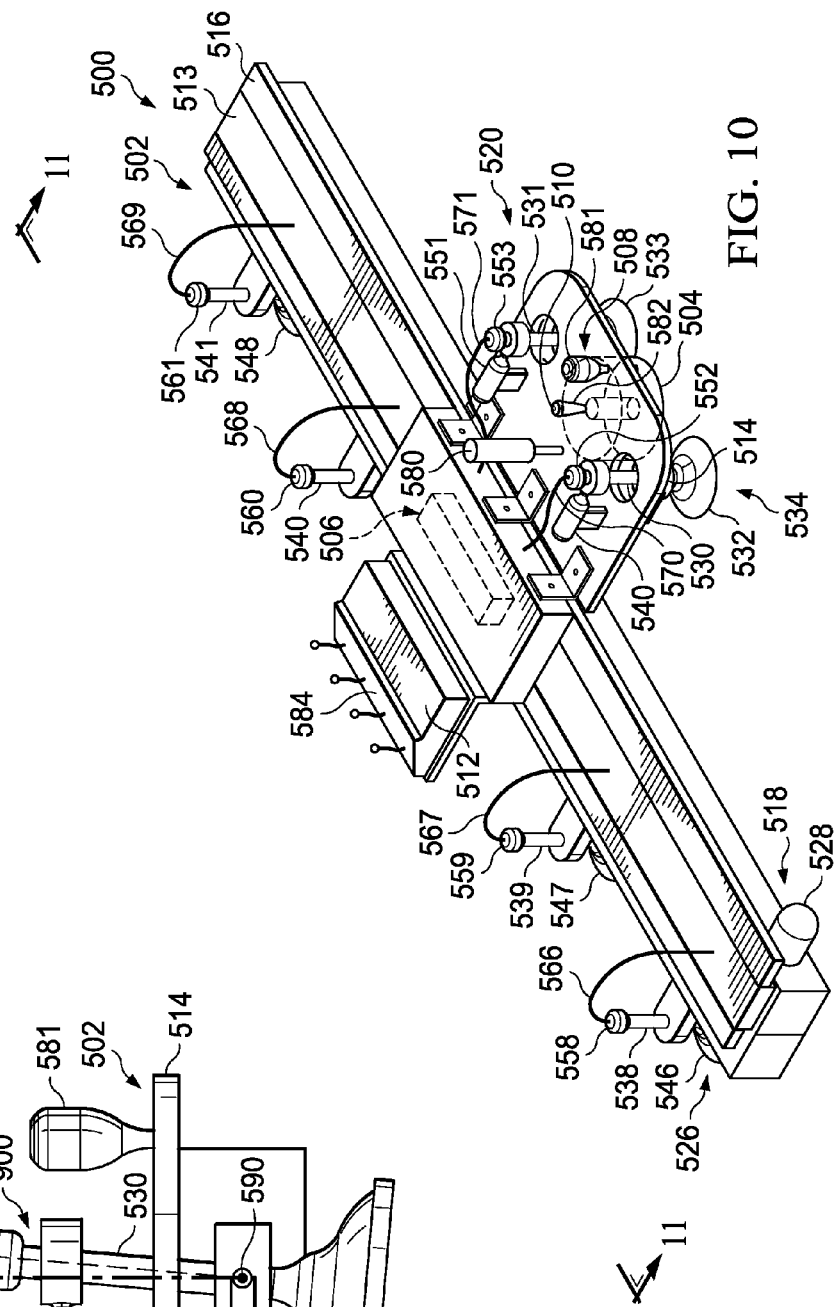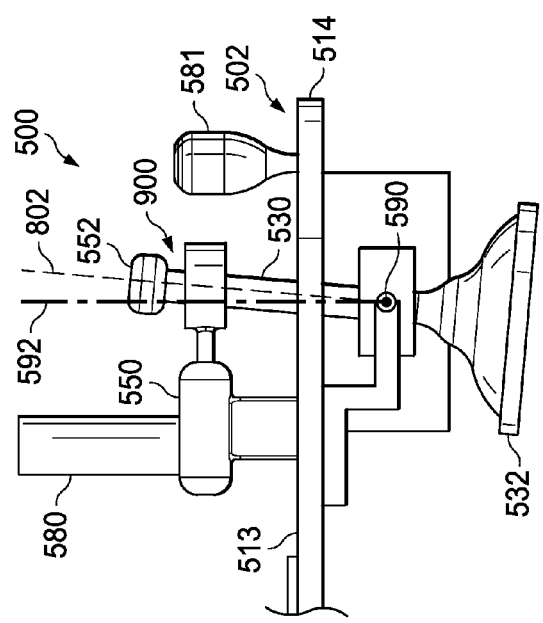

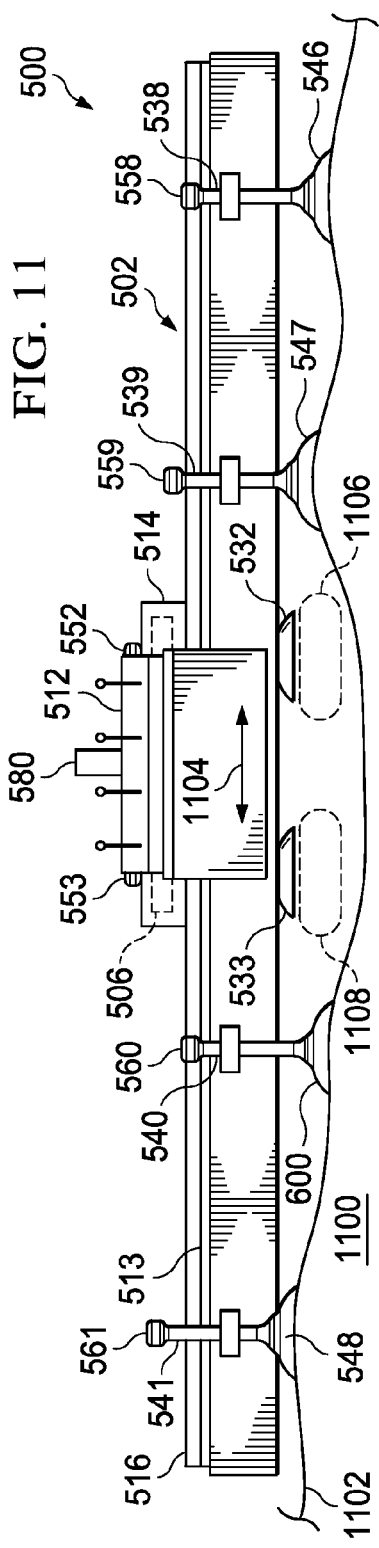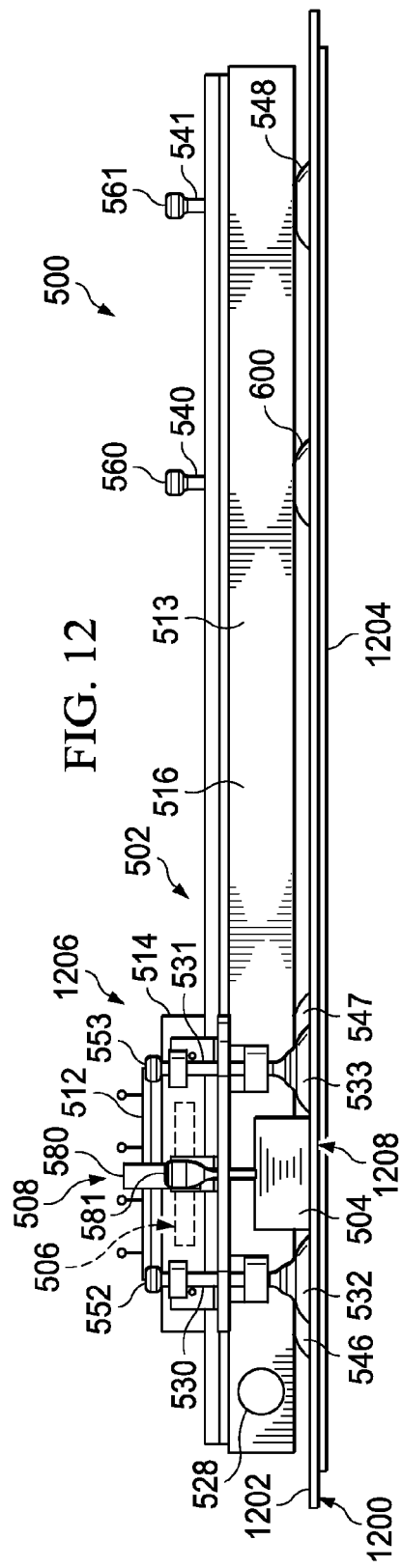

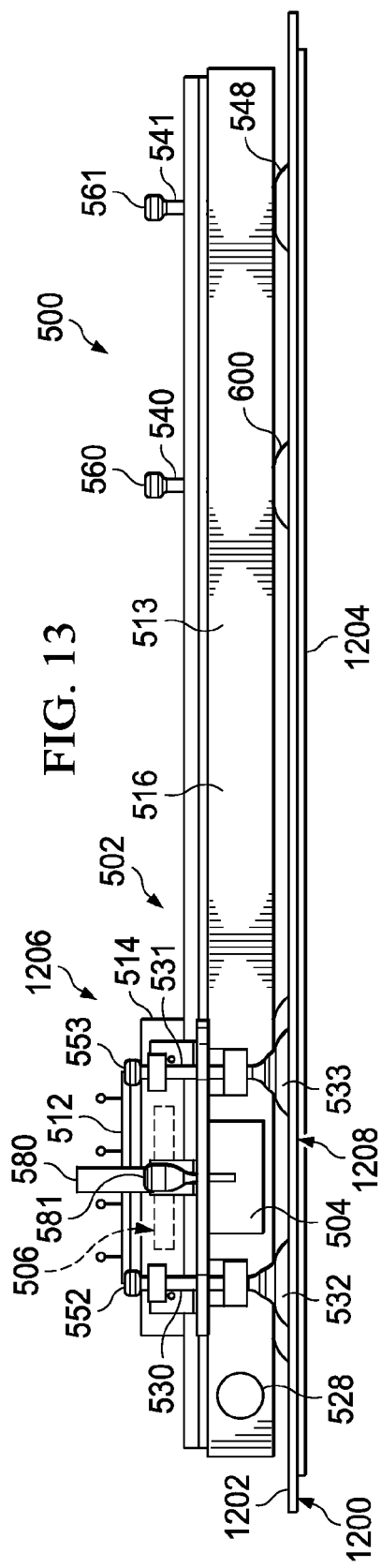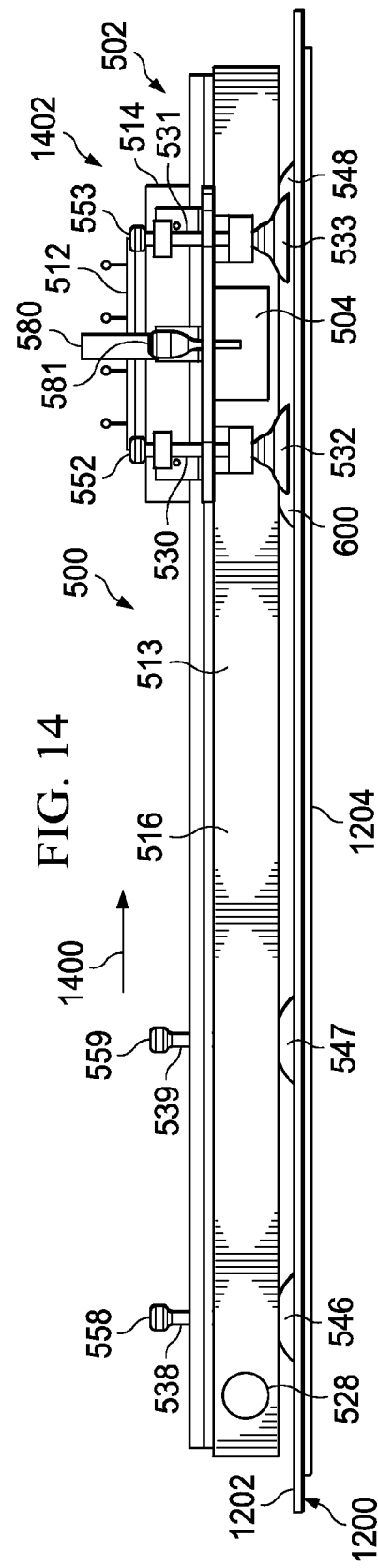

ELECTROMAGNETIC CRAWLER ASSEMBLY SYSTEM

BACKGROUND INFORMATION

1. Field

The present disclosure relates generally to manufacturing and, in particular, to a method and apparatus for attaching parts to each other. Still more particularly, the present disclosure relates to a method and apparatus for attaching parts to each other using a fastening system.

2. Background

In manufacturing structures, different parts may be connected to each other to form the structures. Aircraft structures, such as the wing and fuselage of an aircraft, may be manufactured by attaching parts to each other. For example, without limitation, panels may be placed onto ribs to form a fuselage. Panels also may be attached onto spars and ribs to form a wing for the aircraft.

The attachment of these panels and other parts to each other may be performed by operators or computer-controlled machines. With operators, two operators may be located opposite to each other on a workpiece, such as a panel and a rib. The operators may install clamping devices to hold the parts together. Thereafter, a drill may be operated by one of the operators to create a hole. A rivet or other type of fastener may then be installed into the hole.

This type of process may be time consuming and expensive. Large computer-controlled machines may be used to drill holes and install fasteners to fasten the parts to each other.

In some cases, however, the shape of the structure and/or the location of fasteners may prohibit the use of these machines. In these cases, operators may still perform the drilling and fastener installation operations. As a result, depending on the design of the structure, the time and expense of installing fasteners may be greater than desired.

Therefore, it would be advantageous to have a method and apparatus that takes into account one or more of the issues discussed above, as well as other possible issues.

SUMMARY

In one advantageous embodiment, an apparatus may comprise a frame system and a controller. The frame system may have a first frame and a second frame in which the frame system may be configured to hold an end effector that is configured to perform a number of operations. The first frame and the second frame may be configured for attachment to a workpiece. The controller may be configured to control attachment of the first frame and the second frame to the workpiece by applying a vacuum and a pressure during movement of the frame system.

In another advantageous embodiment, a crawler assembly system may comprise a frame system, a first number of suction cups, a second number of suction cups, a controller, an electromagnetic unit, a vacuum and pressure unit, and an end effector. The frame system may be configured to hold an end effector that is configured to perform a number of operations on a workpiece. The frame system may comprise a first frame, a second frame, a first number of legs, a second number of legs, and a movement system. The first frame and the second frame may be configured to move relative to each other on the workpiece. A first leg in a first portion of the first number of legs may be configured to rotate about a first axis in a first direction. A second leg in a second portion of the first number of legs may be configured to rotate about the first axis in a second direction. Rotation of the first leg in the first direction and the second leg in the second direction about the first axis may cause rotation of the frame system about a second axis that is substantially perpendicular to a surface of the workpiece. The movement system may be configured to move the first frame and the second frame relative to each other. The movement system may be configured to move the first number of legs and the second number of legs to conform to the surface of the workpiece while the end effector is performing the number of operations on the workpiece. The first number of suction cups may be connected to the first frame by the first number of legs. The first number of suction cups may be configured for attachment to the workpiece. A first portion of the first number of suction cups may be connected to the first portion of the first number of legs, and a second portion of the first number of suction cups may be connected to the second portion of the first number of legs. The second number of suction cups may be connected to the second frame by the second number of legs. The second number of suction cups may be configured for attachment to the workpiece. The controller may be configured to control an application of a vacuum and a pressure by the first number of suction cups and the second number of suction cups during movement of the frame system. Movement of the first portion of the first number of legs in the first direction and movement of the second portion of the first number of legs in the second direction, while the vacuum is applied to the first portion of the first number of suction cups and to the second portion of the second number of suction cups and the pressure is applied to the second number of suction cups, may cause the frame system to turn on the surface of the workpiece. The electromagnetic unit may be associated with the first frame. The electromagnetic unit may be configured to attract a magnetic material associated with the workpiece such that the electromagnetic unit may hold the first frame on the workpiece. A channel may extend through the electromagnetic unit and may be configured to receive an end of the end effector and allow the end of the end effector to reach a surface of the workpiece. The vacuum and pressure unit may be connected to the first number of suction cups and the second number of suction cups. The vacuum and pressure unit may be configured to apply at least one of the vacuum and the pressure to the first number of suction cups and the second number of suction cups. The end effector may comprise at least one of a drill unit, a fastener system, a sealant unit, and a vision system.

In yet another advantageous embodiment, a method may be provided for performing operations on a workpiece. A first frame in a frame system may be held on the workpiece by applying a vacuum to the first frame. A second frame in the frame system may be detached from the workpiece by applying a pressure to the second frame. The second frame may be moved to a location on the workpiece. The second frame may be attached to the workpiece by applying the vacuum to the second frame. An operation may be performed on the workpiece.

In still yet another advantageous embodiment, a method may be provided for performing operations on a workpiece. A crawler assembly system may be moved from a first location to a second location. The crawler assembly system may comprise a frame system, a first number of suction cups, a second number of suction cups, and a controller. The frame system may have a first frame and a second frame in which the frame system may be configured to hold an end effector that may be configured to perform a number of operations. The first number of suction cups may be associated with the first frame by a number of legs. The first number of suction cups may be configured for attachment to the workpiece. The second number of suction cups may be associated with the second frame. The second number of suction cups may be configured for attachment to the workpiece. The controller may be configured to control an application of a vacuum and a pressure by the first number of suction cups and the second number of suction cups during movement of the frame system. Moving the crawler assembly system from the first location to the second location may comprise applying the vacuum to the first number of suction cups and the pressure to the second number of suction cups, moving the second frame relative to the first frame while the first number of suction cups holds the first frame to the workpiece, applying the vacuum to the second number of suction cups after movement of the second frame, applying the pressure to the first number of suction cups after the vacuum is applied to the second number of suction cups, moving the first frame relative to the second frame while the second number of suction cups holds the second frame to the workpiece, and repeating the steps of applying the vacuum to the first number of suction cups and the pressure to the second number of suction cups, moving the second frame relative to the first frame while the first number of suction cups holds the first frame to the workpiece, applying the vacuum to the second number of suction cups after movement of the second frame, applying the pressure to the first number of suction cups after the vacuum is applied to the second number of suction cups, and moving the first frame relative to the second frame while the second number of suction cups holds the second frame to the workpiece until the second location is reached. The vacuum may be applied to a first portion of the first number of suction cups connected to a first portion of the number of legs and to a second portion of the first number of suction cups connected to a second portion of the number of legs. The pressure may be applied to the second number of suction cups. A first leg in the first portion of the number of legs may be rotated in a first direction around a first axis. A second leg in the second portion of the first number of legs may be rotated in a second direction about the first axis. Rotation of the first leg and the second leg may cause rotation of the frame system about a second axis that is substantially perpendicular to the surface of the workpiece. The number of operations may be performed at the location on the workpiece.

The features, functions, and advantages can be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 7 is an illustration of a front view of a crawler assembly system in accordance with an advantageous embodiment;

FIG. 8 is an illustration of a cross-sectional side view of a portion of a crawler assembly system in accordance with an advantageous embodiment;

FIG. 9 is an illustration of a cross-sectional side view of a portion of a crawler assembly system in accordance with an advantageous embodiment;

FIG. 10 is an illustration of a crawler assembly system in accordance with an advantageous embodiment;

FIG. 11 is an illustration of a back view of a crawler assembly system placed on a workpiece in accordance with an advantageous embodiment;

FIG. 12 is an illustration of a crawler assembly system on a workpiece in accordance with an advantageous embodiment;

FIG. 13 is an illustration of a crawler assembly system on a workpiece in accordance with an advantageous embodiment;

FIG. 14 is an illustration of a crawler assembly system on a workpiece in accordance with an advantageous embodiment;

DETAILED DESCRIPTION

Figure 1:
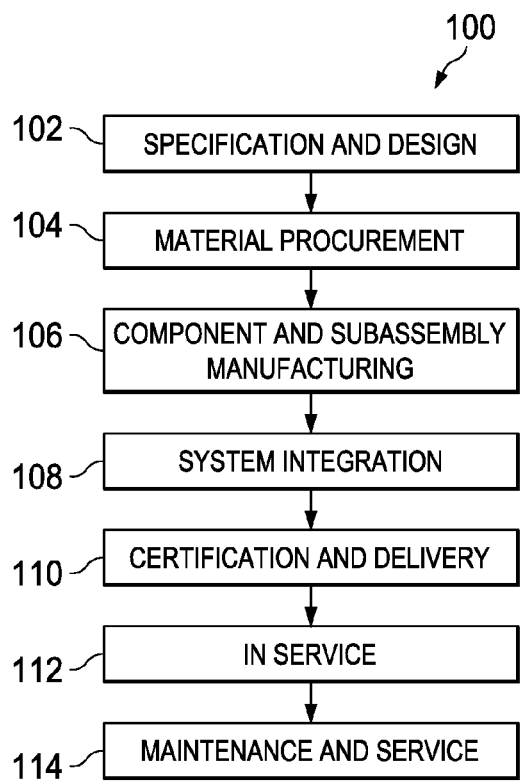
FIG. 1 is an illustration of an aircraft manufacturing and service method in accordance with an advantageous embodiment.
Figure 2:
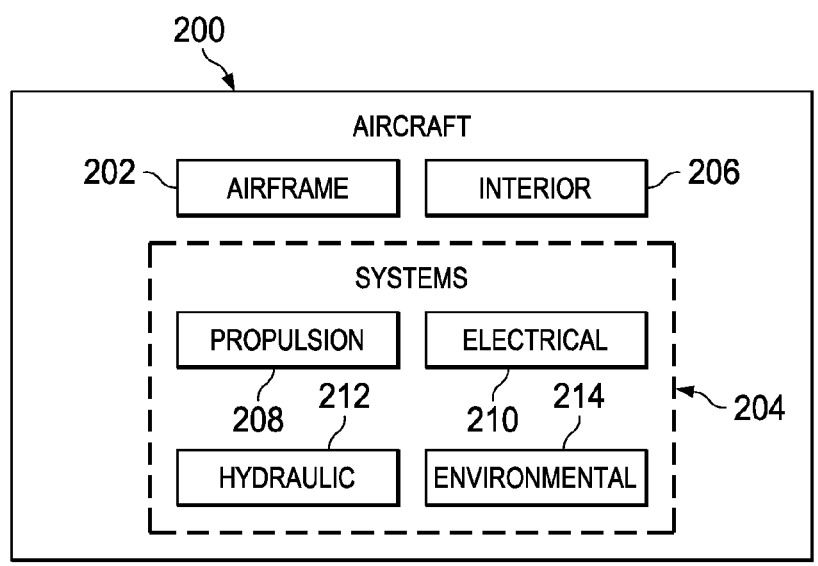
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 may include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments may be one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of considerations. For example, without limitation, the different advantageous embodiments recognize and take into account that smaller robotic machines may be used to reach locations on or within a structure that larger robotic machines may not be able to reach. The different advantageous embodiments recognize and take into account that in locations in which larger robotic machines cannot be used, smaller robotic machines may be employed.

For example, without limitation, some robotic machines may move on the structure being assembled. These robotic machines may use a rail system for movement. A rail system may be attached to the structure.

As one illustrative example, without limitation, when skin panels are clamped to a frame for a fuselage, a rail system may be attached to the structure. The robotic machine may then move along the rails and perform operations to fasten the skin panels to the ribs. These robotic machines may drill holes and insert fasteners to attach skin panels to the ribs of the structure.

The different advantageous embodiments recognize that the use of robotic machines with rail systems may be cumbersome and more time consuming than desired. The rails may need to be repositioned from location to location. This repositioning may require removing the robotic machine, removing the rail, reinstalling the rail in the new location, and then placing the robotic machine back onto the rail.

The different advantageous embodiments also recognize and take into account that, in some cases, the robotic machines may have legs with suction cups. Those suction cups may engage and disengage themselves from the panels and move to different locations to perform operations. The movement of the legs along with the engagement and disengagement of the suction cups may occur in a manner that moves the machine.

The different advantageous embodiments recognize and take into account that these currently used machines may have a first frame and a second frame. The frames may move relative to each other. The legs on both frames may have suction cups that attach to the surface of the structure when a vacuum is applied.

When the robotic machine is ready to move to another location, the suction cups for the legs on one frame may be disengaged. Those legs may then be raised away from the surface of the structure. The first frame may then move relative to the second frame. Thereafter, the legs may be extended back onto the surface. A vacuum may be applied to the suction cups to reengage the suction cups to the surface. Thereafter, the suction cups or the legs on the second frame may be disengaged from the surface of the structure. Those legs may then be retracted. The second frame may move relative to the first frame. Thereafter, the legs may be re-extended and the suction cups may be engaged to the surface.

However, the different advantageous embodiments recognize and take into account that with these types of frames that move in parallel to each other, the systems may be more complex, heavier, and slower than desired. Further, the different advantageous embodiments also recognize that with the use of these types of systems, additional safety features may be needed. These safety features may include additional straps or lines to secure the robotic machine in case the vacuum generated by the suction cups does not provide the needed amount of vacuum to maintain attachment to the structure.

The different advantageous embodiments recognize and take into account that these types of systems may require more time to set up and operate than desired.

Thus, the different advantageous embodiments provide a method and apparatus for performing operations on a structure. In one advantageous embodiment, an apparatus may comprise a frame system, a first number of suction cups, a second number of suction cups, and a controller. The frame system may have a first frame and a second frame in which the frame system may be configured to hold an end effector that is configured to perform a number of operations. The first frame and the second frame may be configured for attachment to a workpiece. The controller may be configured to control attachment of the first frame and the second frame to the workpiece by applying a vacuum and a pressure during movement of the frame system.

Figure 3:
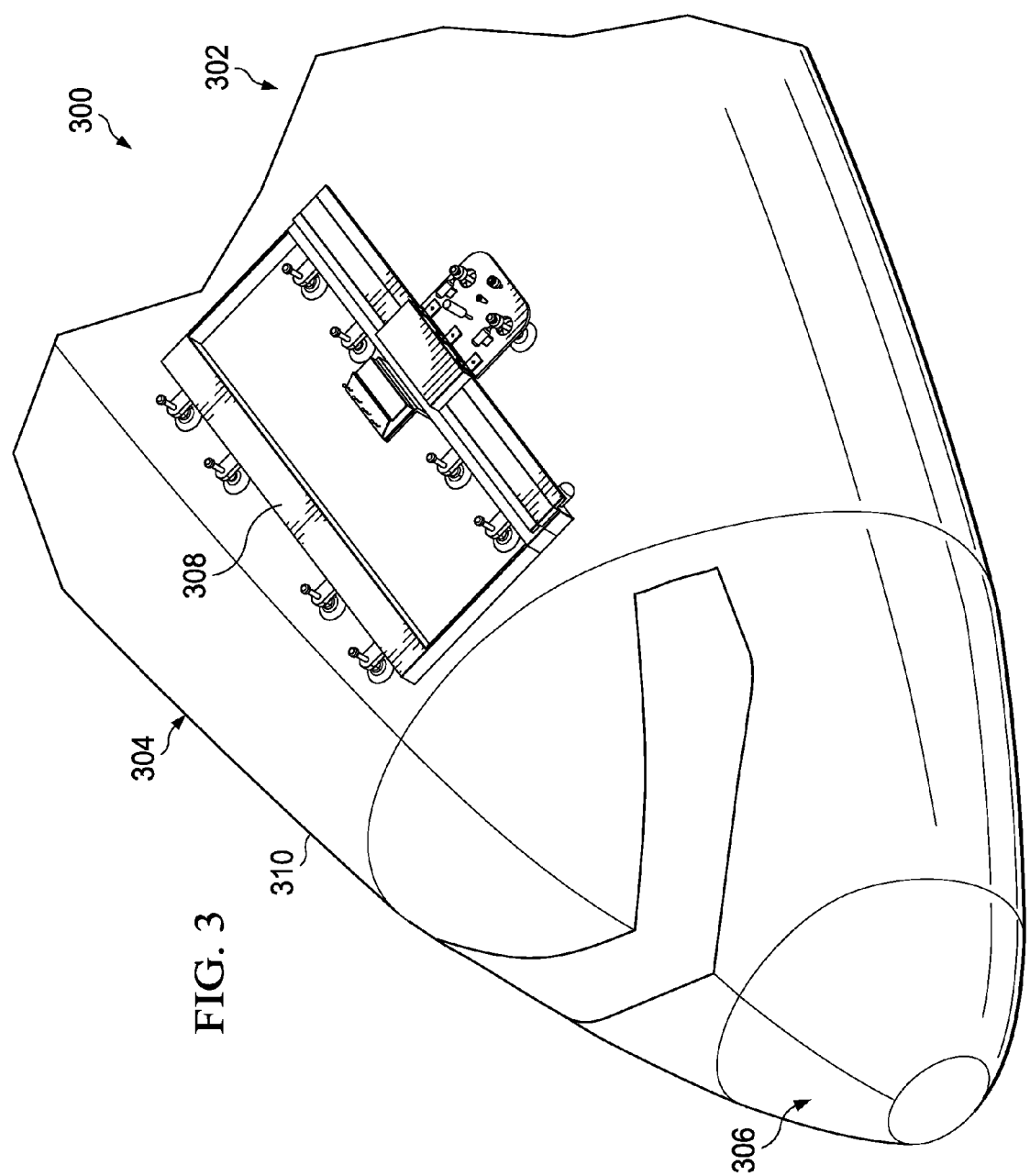
FIG. 3 is an illustration of a manufacturing environment in accordance with an advantageous embodiment.

With reference now to FIG. 3, an illustration of a manufacturing environment is depicted in accordance with an advantageous embodiment. In this illustrative example, manufacturing environment 300 may be an example of an environment that may be used to manufacture structures for aircraft 302. Aircraft 302 may be an example of one implementation for aircraft 200 in FIG. 2. Aircraft 302 may have fuselage 304 and nose 306.

In this depicted example, crawler assembly system 308 may be used to manufacture structures for aircraft 302. Crawler assembly system 308 may be an example of a robotic machine in this illustrative example. Crawler assembly system 308 may be used during at least one of component and subassembly manufacturing 106, system integration 108, maintenance and service 114, and/or other suitable phases during aircraft manufacturing and service method 100 in FIG. 1.

As depicted in this example, crawler assembly system 308 may be placed on surface 310 of fuselage 304. As one illustrative example, crawler assembly system 308 may be used to install fasteners onto surface 310 of fuselage 304. Additionally, crawler assembly system 308 may be used to perform a number of other operations to manufacture structures for aircraft 302.

Figure 4:
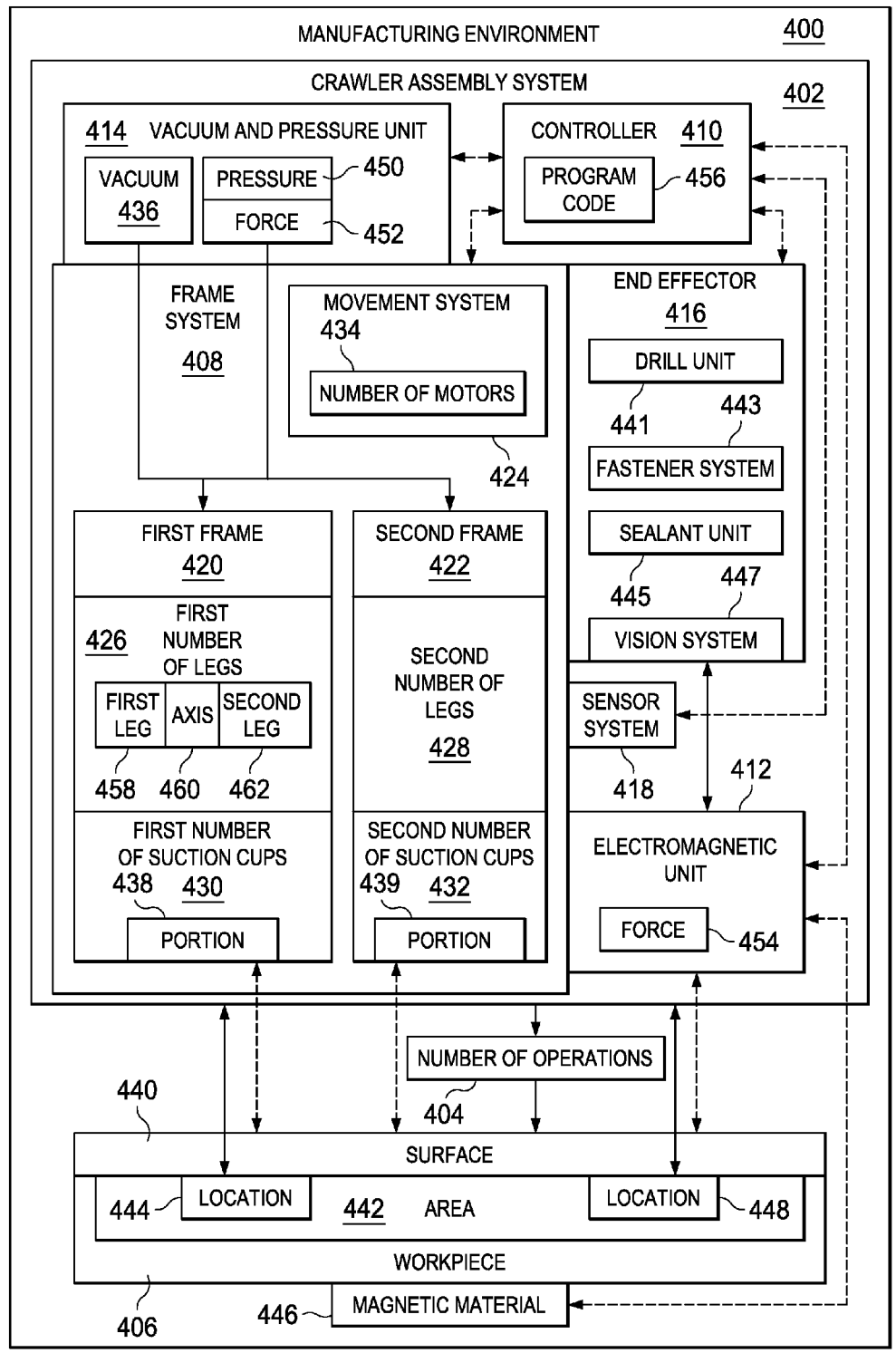
FIG. 4 is an illustration of a manufacturing environment in accordance with an advantageous embodiment.

With reference now to FIG. 4, an illustration of a manufacturing environment is depicted in accordance with an advantageous embodiment. Manufacturing environment 400 is an example of an environment that may be used to manufacture structures for aircraft 200 in FIG. 2. Further, manufacturing environment 300 in FIG. 3 may be an example of one implementation for manufacturing environment 400 in FIG. 4.

In these illustrative examples, manufacturing environment 400 may be used during at least one of component and subassembly manufacturing 106, system integration 108, maintenance and service 114, and other suitable phases during aircraft manufacturing and service method 100 in FIG. 1.

In these illustrative examples, crawler assembly system 402 may perform number of operations 404 on workpiece 406. In these illustrative examples, workpiece 406 may be a structure or a portion of a structure for aircraft 200 in FIG. 2. Of course, workpiece 406 may be for other types of objects other than aircraft 200 in FIG. 2. For example, without limitation, workpiece 406 may be for an automobile, a truck, a building, a spacecraft, a missile, a ship, a submarine, a dam, a bridge, and/or some other suitable type of object.

In this illustrative example, crawler assembly system 402 may comprise frame system 408, controller 410, electromagnetic unit 412, vacuum and pressure unit 414, end effector 416, sensor system 418, and other suitable components. When electromagnetic unit 412 is present, crawler assembly system 402 may be referred to as an electromagnetic crawler assembly system.

Frame system 408 may comprise first frame 420, second frame 422, movement system 424, first number of legs 426, second number of legs 428, first number of suction cups 430, second number of suction cups 432, and/or other suitable components. Frame system 408 may be configured to hold end effector 416.

In these illustrative examples, first frame 420 and second frame 422 may move relative to each other. Movement system 424 may cause first frame 420 and second frame 422 to move relative to each other. In these examples, movement system 424 may comprise number of motors 434.

First number of suction cups 430 may be associated with first frame 420 and may be configured for attachment to workpiece 406. Second number of suction cups 432 may be associated with second frame 422. Second number of suction cups 432 may be configured for attachment to workpiece 406.

In these illustrative examples, a first component may be considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or an extension of the second component.

In these examples, first number of suction cups 430 may be associated with first frame 420 using first number of legs 426. Second number of suction cups 432 may be associated with second frame 422 using second number of legs 428.

In these illustrative examples, the attachment of first number of suction cups 430 and second number of suction cups 432 may be a removable attachment. The attachment may be caused by vacuum 436 applied by vacuum and pressure unit 414. Vacuum 436 may be applied to first number of suction cups 430 through first number of legs 426 and to second number of suction cups 432 through second number of legs 428 in these examples. Vacuum 436 may cause first number of suction cups 430 and second number of suctions cups 432 to be attached to workpiece 406.

In these illustrative examples, vacuum 436 may be applied through at least a portion of first number of suction cups 430 and second number of suction cups 432 to attach portion 438 of first number of suction cups 430 and/or portion 439 of second number of suction cups 432 to surface 440 of workpiece 406. In these examples, first number of suction cups 430 and second number of suction cups 432 may have a number of different shapes and/or sizes.

In these illustrative examples, first number of legs 426 and second number of legs 428 may be moveable relative to surface 440 of workpiece 406. First number of legs 426 and second number of legs 428 may be moveable to conform to surface 440. For example, without limitation, surface 440 may be curved about one or more different axes (not shown). First number of legs 426 and/or second number of legs 428 may be moved relative to surface 440 to allow first number of suction cups 430 and/or second number of suction cups 432 to contact surface 440.

In this manner, vacuum 436 may be applied to attach first number of suction cups 430 and/or second number of suction cups 432 to surface 440 of workpiece 406. The positioning or movement of first number of legs 426 and/or second number of legs 428 may be performed using movement system 424.

In these illustrative examples, movement of crawler assembly system 402 may be accomplished in any number of different ways. In one illustrative example, first number of suction cups 430 and second number of suction cups 432 may be attached to surface 440 of workpiece 406 during the performance of number of operations 404.

In these illustrative examples, end effector 416 may perform number of operations 404 under the control of controller 410. End effector 416 may comprise at least one of drill unit 441, fastener system 443, sealant unit 445, vision system 447, and/or other suitable devices. End effector 416 may be a device that may be moved by crawler assembly system 402 to different locations on workpiece 406 to perform number of operations 404.

In these depicted examples, number of operations 404 may be performed at location 444 within area 442 of workpiece 406. Area 442 may be an area within which end effector 416 may be moved by crawler assembly system 402 without moving frame system 408. After number of operations 404 have been performed, crawler assembly system 402 may be moved to location 448.

In these illustrative examples, end effector 416 may be stabilized using electromagnetic unit 412. Electromagnetic unit 412 may be associated with first frame 420. Electromagnetic unit 412 may engage magnetic material 446 on workpiece 406 to provide better attachment of crawler assembly system 402 to workpiece 406 during performance of number of operations 404. This provides attachment in addition to applying vacuum 436 to first number of suction cups 430 and second number of suction cups 432.

When moving from location 444 to location 448, vacuum 436 may be applied to first number of suction cups 430 and pressure 450 may be applied to second number of suction cups 432. Pressure 450 may provide force 452 to lift second frame 422 away from surface 440 of workpiece 406.

In these illustrative examples, first number of suction cups 430 and second number of suction cups 432 may also be configured to apply vacuum 436 and/or pressure 450. Suction cups of various geometries may be used to implement first number of suction cups 430 and second number of suction cups 432. Examples of suction cups that may be used include, for example, without limitation, suction cups available from Piab USA, Inc.

Second frame 422 may be moved relative to first frame 420 by movement system 424 while pressure 450 is applied to second number of suction cups 432 and vacuum 436 is applied to first number of suction cups 430. After movement of second frame 422 has completed, vacuum 436 may be applied to second number of suction cups 432.

Additionally, pressure 450 may be applied to first number of suction cups 430 while vacuum 436 is applied to second number of suction cups 432. Then, first frame 420 may be moved relative to second frame 422 while vacuum 436 is applied to second number of suction cups 432 and pressure 450 is applied to first number of suction cups 430. This sequence of steps may be performed to move workpiece 406 from location 444 to location 448.

Additionally, in some advantageous embodiments, first frame 420 and second frame 422 may move relative to each other to move frame system 408 from location 444 to location 448, while end effector 416 performs number of operations 404. In this manner, pauses in the performance of number of operations 404 for movement of crawler assembly system 402 may be reduced and/or avoided.

Further, electromagnetic unit 412 may provide force 454 to hold first frame 420 on workpiece 406, while second frame 422 moves relative to first frame 420. Additionally, electromagnetic unit 412 may provide an additional mechanism to hold crawler assembly system 402 on workpiece 406 in case first number of suction cups 430 and second number of suction cups 432 are unable to hold frame system 408 on workpiece 406.

In these illustrative examples, controller 410 may comprise a computer, a processor unit, an application specific integrated circuit, or some other suitable device that controls the operation of crawler assembly system 402. Controller 410 may be configured to control attachment of first frame 420 and second frame 422 to workpiece 406 by applying vacuum 436 and pressure 450 during movement of frame system 408. Controller 410 may store locations and/or operations to be performed on workpiece 406 in the form of program code 456. Program code 456 may be run to perform number of operations 404 on workpiece 406.

Sensor system 418, in these illustrative examples, may be used to identify the location of crawler assembly system 402 on workpiece 406. Further, sensor system 418 may be used to position end effector 416 relative to workpiece 406. Sensor system 418 also may be used to perform inspections on number of operations 404. In these illustrative examples, sensor system 418 may comprise, for example, without limitation, infrared sensors, cameras, ultrasonic sensors, and/or other suitable types of sensors.

The illustration of manufacturing environment 400 is not meant to imply physical architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, crawler assembly systems in addition to crawler assembly system 402 may be present to perform operations on workpiece 406. In still other advantageous embodiments, crawler assembly system 402 may comprise a number of additional end effectors in addition to end effector 416. Also, additional electromagnetic units in addition to electromagnetic unit 412 may be present.

In these illustrative examples, first leg 458 and second leg 462 in first number of legs 426 may be configured to rotate about axis 460. The rotation of first leg 458 and/or second leg 462 about axis 460 may cause electromagnetic unit 412 to rotate about axis 460. In this manner, the positioning of electromagnetic unit 412 may be performed for different types of surfaces on workpiece 406.

Figure 5:
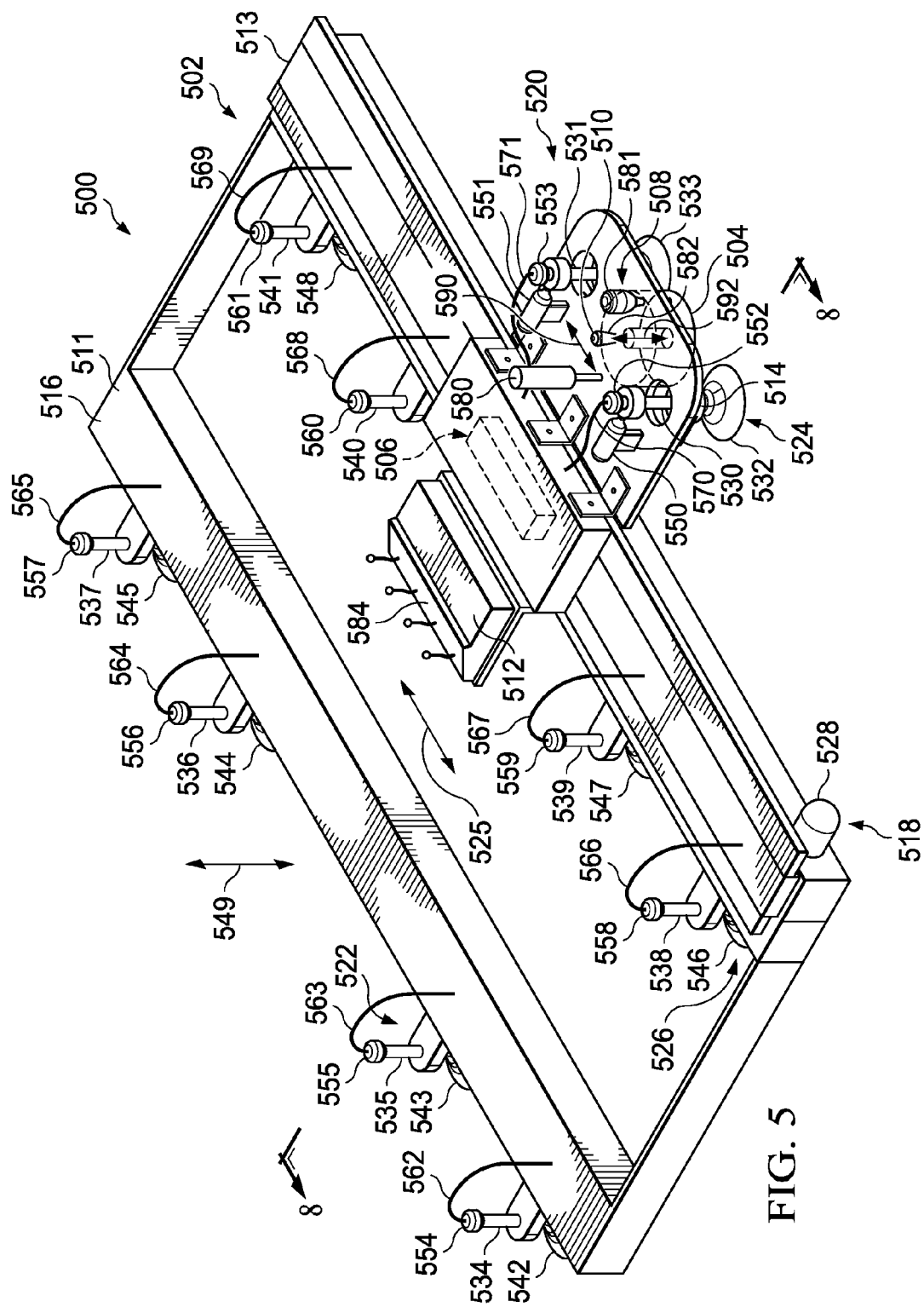
FIG. 5 is an illustration of a crawler assembly system in accordance with an advantageous embodiment.

With reference now to FIG. 5, an illustration of a crawler assembly system is depicted in accordance with an advantageous embodiment. In this illustrative example, crawler assembly system 500 may be an example of one implementation for crawler assembly system 308 in FIG. 3 and/or crawler assembly system 402 in FIG. 4.

Crawler assembly system 500 may include frame system 502, electromagnetic unit 504, vacuum and pressure unit 506, end effector 508, sensor system 510, and controller 512. In this illustrative example, frame system 502 may comprise first frame 514, second frame 516, movement system 518, first number of legs 520, second number of legs 522, first number of suction cups 524, and second number of suction cups 526.

In this depicted example, second frame 516 may include portion 511 and portion 513. Portion 511 and portion 513 may be attached to each other to form second frame 516. Further, first frame 514 may be associated with portion 513 of second frame 516.

First frame 514 and second frame 516 may move relative to each other using movement system 518. Movement system 518 may include motor 528 in this illustrative example. Additionally, movement system 518 may include motors 552, 553, 554, 555, 556, 557, 558, 559, 560, and 561. Movement system 518 may be used to move at least a portion of first number of legs 520 relative to at least a first portion of second number of legs 522.

In this depicted example, first number of legs 520 and first number of suction cups 524 may be associated with first frame 514. First number of legs 520 may include leg 530 and leg 531. First number of suction cups 524 may include suction cup 532 and suction cup 533 attached to leg 530 and leg 531, respectively. First number of suction cups 524 may be configured to be attached to a surface of a workpiece (not shown), such as workpiece 406 in FIG. 4.

Second number of legs 522 and second number of suction cups 526 may be associated with second frame 516. Second number of legs 522 may include legs 534, 535, 536, 537, 538, 539, 540, and 541. Second number of suction cups 526 may include suction cups 542, 543, 544, 545, 546, 547, and 548 attached to legs 534, 535, 536, 537, 538, 539, and 541, respectively, and another suction cup (not shown) attached to leg 540. Second number of suction cups 526 also may be configured to be attached to the surface of the workpiece.

In this illustrative example, first number of legs 520 and second number of legs 522 may be moveable. Movement of first number of legs 520 and/or second number of legs 522 may be provided by movement system 518.

For example, without limitation, motor 552 and motor 553 may move leg 530 and leg 531, respectively, vertically in the direction of arrow 549. Further, motors 554, 555, 556, 557, 558, 559, 560, and 561 may be associated with legs 534, 535, 536, 537, 538, 539, 540, and 541, respectively. Each of these motors may be configured to move a corresponding leg vertically in the direction of arrow 549. Legs within first number of legs 520 and/or second number of legs 522 may be moved to different positions by movement system 518.

With this type of movement for first number of legs 520 and second number of legs 522, first number of legs 520 and second number of legs 522 may be capable of substantially conforming to the surface of the workpiece when the surface is a curved surface. For example, legs within first number of legs 520 and/or second number of legs 522 may be moved such that first number of suction cups 524 and second number of suction cups 526 may all contact the curved surface of the workpiece.

The attachment of first number of suction cups 524 and second number of suction cups 526 to the workpiece may be performed using vacuum and pressure unit 506. Vacuum and pressure unit 506 may include lines that connect vacuum and pressure unit 506 to first number of legs 520 and second number of legs 522.

For example, without limitation, vacuum and pressure unit 506 may include lines 562, 563, 564, 565, 566, 567, 568, and 569 that connect to legs 534, 535, 536, 537, 538, 539, 540, and 541, respectively. Further, vacuum and pressure unit 506 may include line 570 and line 571 that connect to leg 530 and leg 531, respectively. Vacuum and pressure unit 506 may apply a vacuum and/or pressure to these legs through these lines.

Vacuum and pressure unit 506 may generate a vacuum such that at least a portion of first number of suction cups 524 and/or second number of suction cups 526 may attach to a surface of the workpiece. In particular, vacuum and pressure unit 506 may generate a vacuum through at least a portion of second number of legs 522 and/or first number of legs 520 such that at least a portion of first number of suction cups 524 and/or second number of suction cups 526 may attach to a surface of the workpiece. In other words, vacuum and pressure unit 506 may evacuate the air within at least a portion of first number of suction cups 524 and/or second number of suction cups 526 to generate the vacuum that allows attachment to the surface of the workpiece.

In this illustrative example, first frame 514 may move relative to second frame 516 in the direction of arrow 549 and the direction of arrow 525 using vacuum and pressure unit 506 and movement system 518. For example, without limitation, vacuum and pressure unit 506 may apply a vacuum to first number of suction cups 524. The vacuum may cause first number of suction cups 524 to attach to the surface of the workpiece.

Vacuum and pressure unit 506 may also apply pressure to second number of suction cups 526. In other words, vacuum and pressure unit 506 may pressurize second number of suction cups 526 instead of applying a vacuum to second number of suction cups 526. This pressurization may provide a force to lift second number of suctions cups 526 off the surface of the workpiece. Further, the pressurization of second number of suction cups 526 may be provided by a cushion of air in this illustrative example. In this manner, second frame 516 may be lifted off of the surface of the workpiece by the pressure applied by vacuum and pressure unit 506.

With second frame 516 lifted off the surface of the workpiece, motor 528 may be operated to move second frame 516 relative to first frame 514. Second frame 516 may be moved in the direction of arrow 525 while first frame 514 remains attached to the surface of the workpiece by first number of suction cups 524.

When second frame 516 has been moved to the desired location, vacuum and pressure unit 506 may apply a vacuum to second number of suction cups 526 to attach second number of suction cups 526 to the surface of the workpiece. In these illustrative examples, crawler assembly system 500 may be moved over the surface of the workpiece by moving either first frame 514 or second frame 516 first.

In these depicted examples, each suction cup in first number of suction cups 524 and second number of suction cups 526 may have a flexibility that may allow each suction cup to attach to a curved surface. Further, this flexibility may allow at least a portion of first number of suction cups 524 and/or second number of suction cups 526 to attach to a surface at an angle relative to a surface to which another portion of first number of suction cups 524 and/or second number of suction cups 526 is attached. As one illustrative example, one portion of second number of suction cups 526 may be attached to a portion of a surface at a first angle and another portion of second number of suction cups 526 may be attached to another portion of the surface at a second angle.

Additionally, crawler assembly system 500 may also have motor 550 and motor 551 associated with first frame 514. Motor 550 and motor 551 may be electric motors, air motors, air cylinders, and/or some other suitable type of motor. Motor 550 and motor 551 may be used to rotate at least one of leg 530 and leg 531. For example, without limitation, leg 530 may be rotated in a first direction about axis 590, and leg 531 may be rotated in a second direction about axis 590. Rotation of leg 530 and leg 531, while a vacuum is applied to suction cup 532 and suction cup 533, may cause rotation of frame system 502 about axis 592. Rotation of frame system 502 about axis 592 may cause crawler assembly system 500 to turn on the surface of a workpiece.

Additionally, motor 550 and motor 551 may be used to rotate leg 530 and leg 531 such that suction cup 532 and suction cup 533 may contact a curved surface for the workpiece.

In this illustrative example, electromagnetic unit 504 may provide additional attachment of crawler assembly system 500 to the workpiece. For example, without limitation, electromagnetic unit 504 may provide additional attachment of crawler assembly system 500 to the workpiece if any of the suctions cups in first number of suction cups 524 or second number of suction cups 526 do not attach to the workpiece as desired.

Additionally, end effector 508 may be used to perform a number of operations on the workpiece. In this illustrative example, end effector 508 may include drill unit 580 and fastener system 581. Drill unit 580 may be used to perform drilling operations, and fastener system 581 may be used to perform fastening operations. These operations may be performed while first frame 514 is attached to the workpiece. Second frame 516 may be attached to the workpiece or may be moving towards a desired location while the operations are performed by end effector 508.

In this illustrative example, sensor system 510 may be used to generate information about the surface of the workpiece on which the operations are to be performed. For example, without limitation, sensor system 510 may include camera 582 in this depicted example. Camera 582 may be used to generate image information used to identify the location at which the operations are to be performed. Further, the image information may also be used for positioning drill unit 580 and/or fastener system 581 for performing the operations.

As depicted in this illustrative example, controller 512 may be associated with first frame 514. Controller 512 may take the form of computer system 584 in this depicted example. Computer system 584 may be used to control crawler assembly system 500. For example, without limitation, computer system 584 may be used to control the movement of crawler assembly system 500 by movement system 518, the positioning of end effector 508, the types of operations performed by end effector 508, and/or other suitable operations.

In these illustrative examples, controller 512 may be operated manually and/or automatically. For example, in some cases, controller 512 may run program code to control crawler assembly system 500. In other examples, controller 512 may be operated by a human operator.

Figure 6:
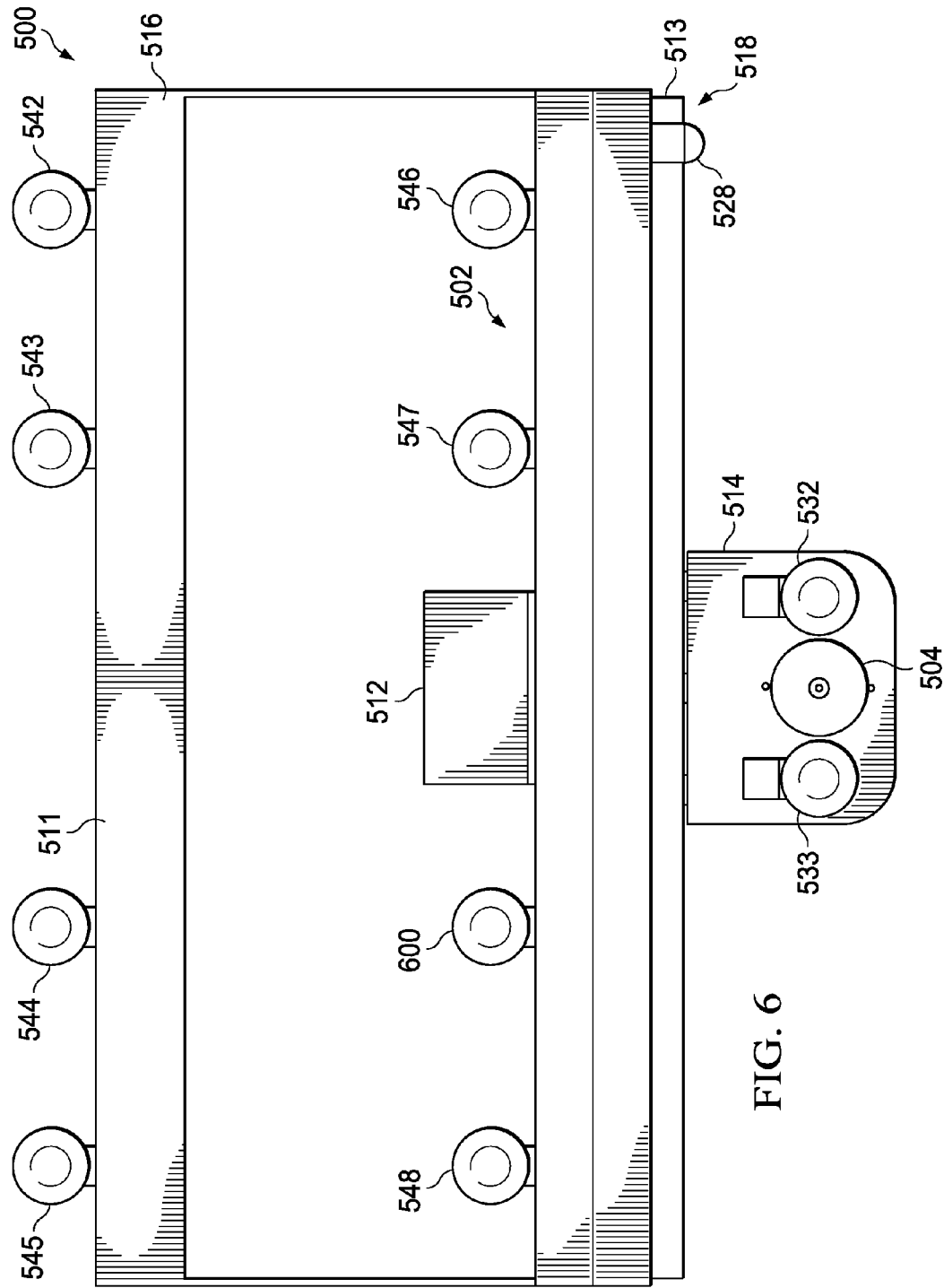
FIG. 6 is an illustration of a bottom view of a crawler assembly structure in accordance with an advantageous embodiment.

With reference now to FIG. 6, an illustration of a bottom view of a crawler assembly structure is depicted in accordance with an advantageous embodiment. In this illustrative example, suction cup 600 in second number of suction cups 526 for crawler assembly system 500 in FIG. 5 may be seen. Suction cup 600 may be associated with leg 540 in second number of legs 522 in FIG. 5.

With reference now to FIG. 7, an illustration of a front view of a crawler assembly system is depicted in accordance with an advantageous embodiment. In this illustrative example, crawler assembly system 500 may be seen from the front of first frame 514. As depicted, crawler assembly system 500 may be placed on workpiece 700. In particular, suction cups 546, 547, 600, and 548 may be seen attached to surface 702 of workpiece 700.

With reference now to FIG. 8, an illustration of a cross-sectional side view of a portion of a crawler assembly system is depicted in accordance with an advantageous embodiment. As depicted in this example, crawler assembly system 500 may use motor 550 to rotate leg 530 about axis 590 substantially perpendicular to axis 592. Leg 530 may be rotated about axis 590 such that center line 802 for leg 530 may be rotated about plus or minus five degrees away from axis 592 in the direction of arrow 800.

With reference now to FIG. 9, an illustration of a cross-sectional side view of a portion of a crawler assembly system is depicted in accordance with an advantageous embodiment. In this illustrative example, center line 802 for leg 530 has been rotated to position 900. As depicted, position 900 may be about plus five degrees away from axis 592. The rotation of leg 530 may be caused by the operation of motor 550 in this illustrative example.

Additionally, leg 531 in FIG. 5 may also be rotated to a position away from axis 592 in a direction opposite to the rotation of leg 530 in this illustrative example. Rotation of these two legs in opposite directions may cause frame system 502 to rotate about axis 592. In this manner, crawler assembly system 500 may be turned using motor 550 and motor 551 in FIG. 5 to rotate leg 530 and leg 531, respectively.

With reference now to FIG. 10, an illustration of a crawler assembly system is depicted in accordance with an advantageous embodiment. In this illustrative example, crawler assembly system 500 may have a different configuration as compared to the configuration for crawler assembly system 500 in FIG. 5.

As depicted in this example, portion 511 of second frame 516 may be removed. Only portion 513 of second frame 516 may be present for crawler assembly system 500. Removal of portion 511 may reduce the size and/or weight of crawler assembly system 500. This reduction in size and/or weight may allow crawler assembly system 500 to move to a greater number of locations and be in a greater number of positions as compared to when portion 511 is present for crawler assembly system 500.

With reference now to FIG. 11, an illustration of a back view of a crawler assembly system placed on a workpiece is depicted in accordance with an advantageous embodiment. In this illustrative example, a back view of crawler assembly system 500 may be illustrated taken along lines 11-11 in FIG. 10. As depicted, crawler assembly system 500 may be shown from the view of controller 512.

In this illustrative example, crawler assembly system 500 may be placed on workpiece 1100. Workpiece 1100 may have curved surface 1102 in this illustrative example. Legs 538, 539, 540, and 541 may be moved such that suction cup 546, 547, 600, and 548 are in contact with curved surface 1102.

In this illustrative example, suction cup 532 and suction cup 533 may not be in contact with curved surface 1102 such that first frame 514 may be moved along axis 1104. For example, without limitation, vacuum and pressure unit 506 may apply pressure to suction cup 532 and suction cup 533. In other words, the vacuum applied to suction cup 532 and suction cup 533 may be removed by pressurizing suction cup 532 and suction cup 533.

This pressurization of these suction cups may provide the force needed to lift suction cup 532 and suction cup 533 off of curved surface 1102. In particular, this force may be provided by, for example, without limitation, cushion of air 1106 under suction cup 532 and cushion of air 1108 under suction cup 533. When suction cup 532 and suction cup 533 are lifted off of curved surface 1102, first frame 514 may be moved along axis 1104 to a desired location.

Further, leg 530 in FIG. 9 and leg 531 in FIG. 7 may be moved such that suction cup 532 and suction cup 533 may not come in contact with curved surface 1102 while first frame 514 is moved. In some illustrative examples, leg 530 and leg 531 may not need to be moved, because cushion of air 1106 and cushion of air 1108 may provide force sufficient to lift suction cup 532 and suction cup 533, respectively, off of curved surface 1102 as first frame 514 is moved along axis 1104.

With reference now to FIGS. 12-15, illustrations of a crawler assembly system on a workpiece are depicted in accordance with an advantageous embodiment. In these illustrative examples, crawler assembly system 500 in FIGS. 12-15 has the configuration presented in FIG. 10.

Turning now to FIG. 12, crawler assembly system 500 may be placed on workpiece 1200. Suction cups 532, 533, 546, 547, 600, and 548 may be attached to surface 1202 of workpiece 1200. Suction cups 532, 533, 546, 547, 600, and 548 may be attached to surface 1202 using a vacuum provided by vacuum and pressure unit 506.

As depicted in this example, electromagnetic unit 504 may attach to magnetic material 1204 positioned under workpiece 1200 to provide additional attachment of crawler assembly system 500 to workpiece 1200 in addition to the attachment provided by suction cups 532, 533, 546, 547, 600, and 548.

In this illustrative example, first frame 514 may be in position 1206 on workpiece 1200. First frame 514 may be in position 1206 such that fastener unit 581 may be placed over location 1208 on workpiece 1200. Fastener unit 581 for end effector 508 may be used to perform fastening operations at location 1208 on workpiece 1200.

In FIG. 13, when fastening operations have been completed, controller 512 may release the attachment of electromagnetic unit 504 from surface 1202 of workpiece 1200. Further, vacuum and pressure unit 506 may apply pressure to suction cup 532 and suction cup 533 to lift suction cup 532 and suction cup 533 off of surface 1202.

Turning now to FIG. 14, with suction cup 532 and suction cup 533 no longer in contact with surface 1202, first frame 514 may be moved from position 1204 in FIGS. 12 and 13 in the direction of arrow 1400 to position 1402. Second frame 516 may not move while first frame 514 is moved.

Figure 15:
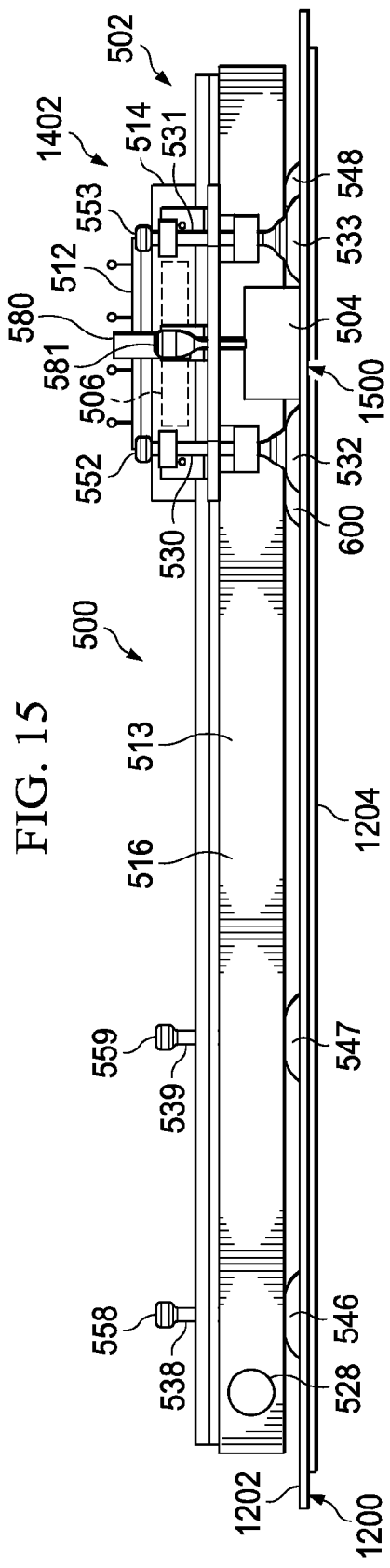
FIG. 15 is an illustration of a crawler assembly system on a workpiece in accordance with an advantageous embodiment.

In FIG. 15, controller 512 may control electromagnetic unit 504 such that electromagnetic unit 504 attaches to surface 1202. Further, vacuum and pressure unit 506 may apply a vacuum to suction cup 532 and suction cup 533 such that suction cup 532 and suction cup 533 attach to surface 1202. With first frame 514 at position 1402 and suction cup 532 and suction cup 533 attached to surface 1202, fastener system 581 may be used to perform fastening operations at location 1500 on workpiece 1200.

Figure 16:
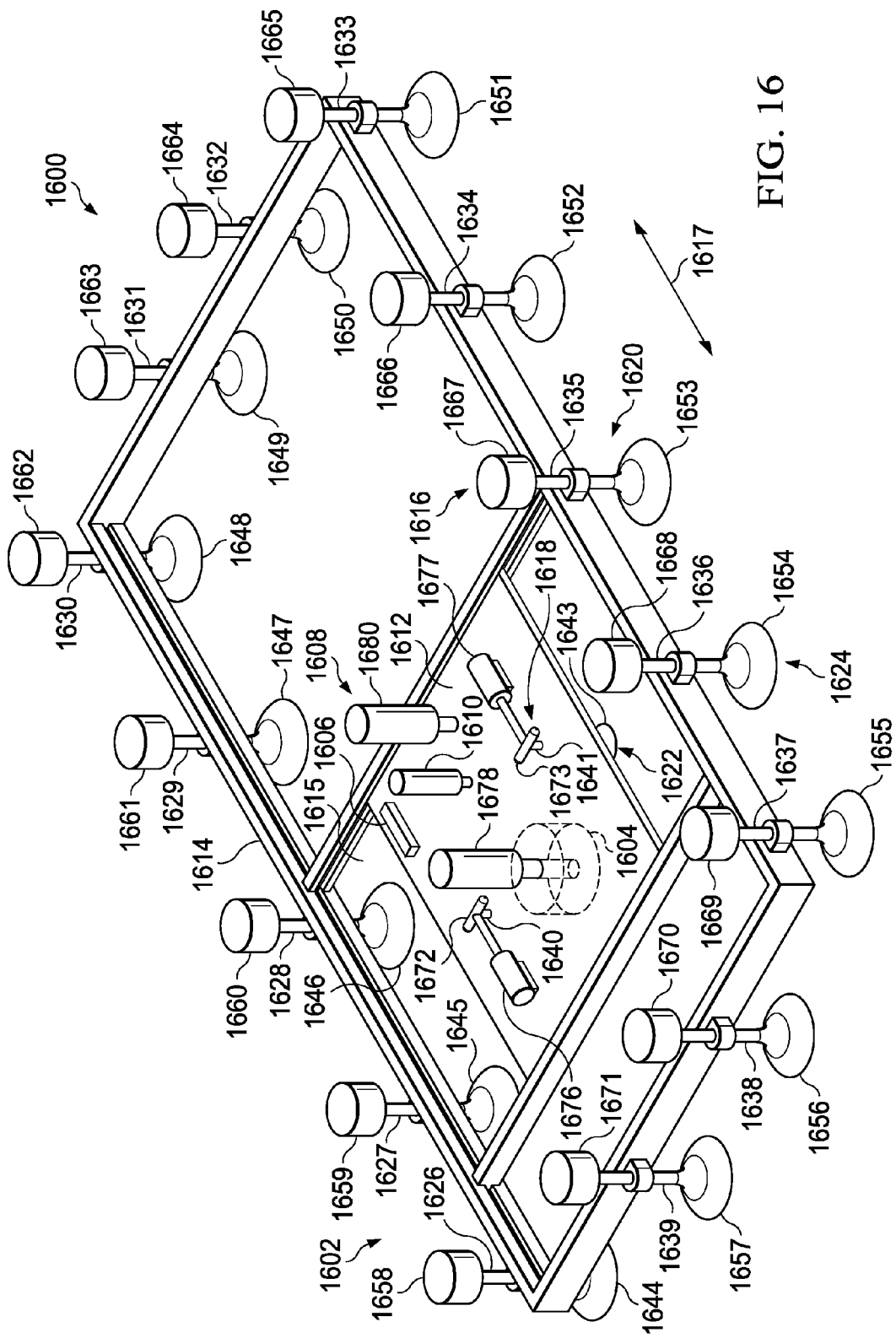
FIG. 16 is an illustration of a crawler assembly system in accordance with an advantageous embodiment.

With reference now to FIG. 16, an illustration of a crawler assembly system is depicted in accordance with an advantageous embodiment. In this illustrative example, crawler assembly system 1600 may be an example of one implementation of crawler assembly system 402 in FIG. 4 and/or crawler assembly system 308 in FIG. 3.

As depicted in this example, crawler assembly system 1600 may include frame system 1602, electromagnetic unit 1604, vacuum and pressure unit 1606, end effector 1608, and sensor system 1610. Frame system 1602 may comprise first frame 1612, second frame 1614, movement system 1616, first number of legs 1618, second number of legs 1620, first number of suction cups 1622, and second number of suction cups 1624.

In this illustrative example, first frame 1612 may be positioned within interior 1615 of second frame 1614. This configuration for crawler assembly system 1600 may be different than the configuration for crawler assembly system 500 in FIG. 5 and in FIG. 9.

First number of legs 1618 may be associated with first frame 1612 and may include leg 1640 and leg 1641. Second number of legs 1620 may be associated with second frame 1614 and may include legs 1626, 1627, 1628, 1629, 1630, 1631, 1632, 1633, 1634, 1635, 1636, 1637, 1638, and 1639.

First number of suction cups 1622 may include suction cup 1643 attached to leg 1641 and another suction cup (not shown) attached to leg 1640. Second number of suction cups 1624 may include suction cups 1644, 1645, 1646, 1647, 1648, 1649, 1650, 1651, 1652, 1653, 1654, 1655, 1656, and 1657 attached to legs 1626, 1627, 1628, 1629, 1630, 1631, 1632, 1633, 1634, 1635, 1636, 1637, 1638, and 1639, respectively.

In these illustrative examples, movement system 1616 may be configured to move first frame 1612 relative to second frame 1614. Movement system 1616 may be configured to move first frame 1612 and/or second frame 1614 along axis 1617.

Further, movement system 1616 may be configured to move first number of legs 1618 and/or second number of legs 1620 vertically such that first number of suction cups 1622 and/or second number of suction cups 1624 may all contact the surface of a workpiece (not shown).

Movement system 1616 may include motors 1658, 1659, 1660, 1661, 1662, 1663, 1664, 1665, 1666, 1667, 1668, 1669, 1670, and 1671 associated with legs 1626, 1627, 1628, 1629, 1630, 1631, 1632, 1633, 1634, 1635, 1636, 1637, 1638, and 1639, respectively. Further, movement system 1616 may include motor 1672 associated with leg 1640, motor 1673 associated with leg 1641, and/or other suitable motors not shown in this view.

In this illustrative example, motor 1676 and motor 1677 may be associated with first frame 1612. Motor 1676 may tilt leg 1640 and/or motor 1677 may tilt leg 1641 relative to the surface of the workpiece such that first number of suction cups 1622 may conform to the surface of the workpiece.

Electromagnetic unit 1604 may provide additional attachment for crawler assembly system 1600 to a workpiece. Additionally, end effector 1608 may include fastener system 1678 and drill unit 1680. Fastener system 1678 and drill unit 1680 may be associated with first frame 1612. Fastener system 1678 may be used to perform fastening operations on the workpiece. Drill unit 1680 may be used to perform drilling operations on the workpiece.

Sensor system 1610 may be used to identify the location on the workpiece at which to perform operations. Further, sensor system 1610 may be used to position end effector 1608 to perform the operations and/or inspect the operations being performed.

Figure 17:
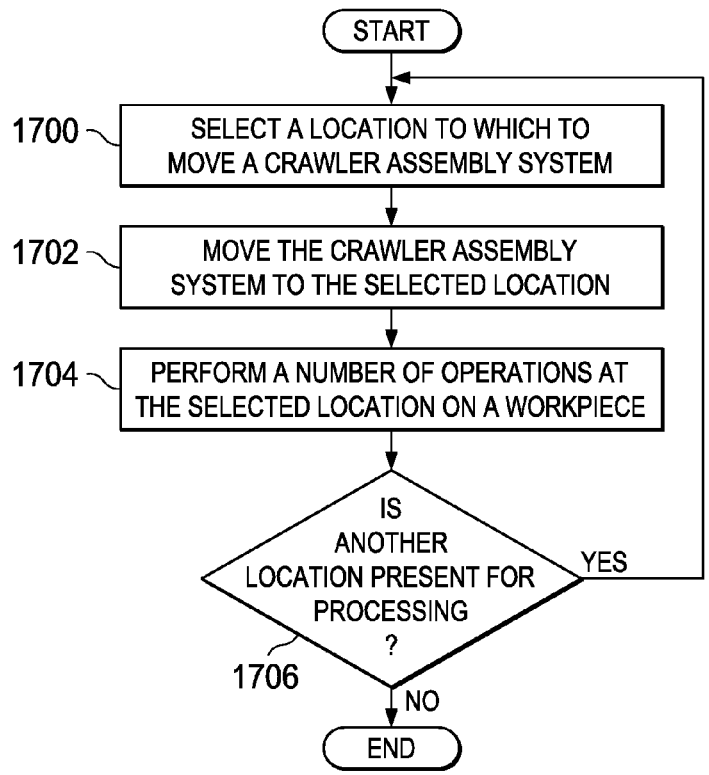
FIG. 17 is an illustration of a flowchart of a process for performing operations on a workpiece in accordance with an advantageous embodiment.

With reference now to FIG. 17, an illustration of a flowchart of a process for performing operations on a workpiece is depicted in accordance with an advantageous embodiment. The process illustrated in FIG. 17 may be implemented using crawler assembly system 402 in FIG. 4.

The process may begin by selecting a location to which to move crawler assembly system 402 (operation 1700). Crawler assembly system 402 may comprise frame system 408 having first frame 420, second frame 422, first number of suction cups 430, second number of suction cups 432, and controller 410. Frame system 408 may be configured to hold end effector 416. End effector 416 may be configured to perform number of operations 404.

The process may then move crawler assembly system 402 to the selected location (operation 1702). Next, the process may perform number of operations 404 at the selected location on workpiece 406 (operation 1704).

Thereafter, the process may determine whether another location is present for processing (operation 1706). If another location is present for processing, the process returns to operation 1700. Otherwise, the process may terminate.

Figure 18:
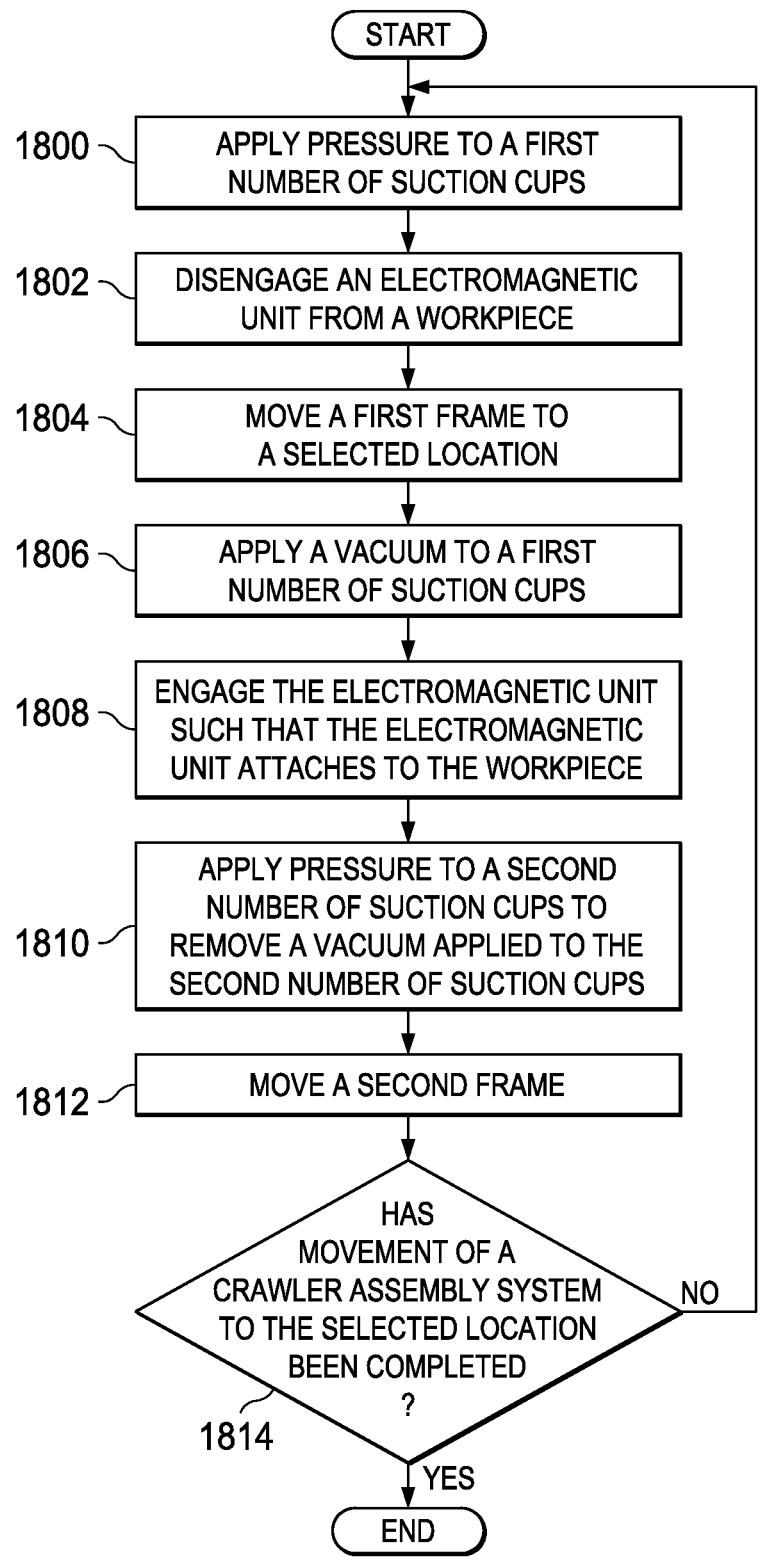
FIG. 18 is an illustration of a flowchart of a process for moving a crawler assembly system in accordance with an advantageous embodiment.

With reference now to FIG. 18, an illustration of a flowchart of a process for moving a crawler assembly system is depicted in accordance with an advantageous embodiment. The process illustrated in FIG. 18 may be implemented using crawler assembly system 402 in FIG. 4. This process may be a more-detailed process for operation 1702 in FIG. 17.

The process may begin by applying pressure 450 to first number of suction cups 430 (operation 1800). Pressure 450 may provide force 452 that may lift first number of suction cups 430 off of surface 440 of workpiece 406. In this illustrative example, vacuum 436 may be applied to second number of suction cups 432 such that second number of suction cups 432 may be attached to surface 440 of workpiece 406.

The process may then disengage electromagnetic unit 412 from workpiece 406 (operation 1802). Next, the process may move first frame 420 to a selected location (operation 1804). Second frame 422 may not move when first frame 420 is moved to the selected location.

Thereafter, the process may apply vacuum 436 to first number of suction cups 430 (operation 1806). Next, the process may engage electromagnetic unit 412 such that electromagnetic unit 412 attaches to workpiece 406 (operation 1808).

The process may then apply pressure to second number of suction cups 432 to remove vacuum 436 applied to second number of suction cups 432 (operation 1810). Next, the process may move second frame 422 (operation 1812). Thereafter, the process may determine whether movement of crawler assembly system 402 to the selected location has been completed (operation 1814). If movement of crawler assembly system 402 to the selected location has not been completed, the process may return to operation 1800 as described above. Otherwise, the process may terminate.

Figure 19:
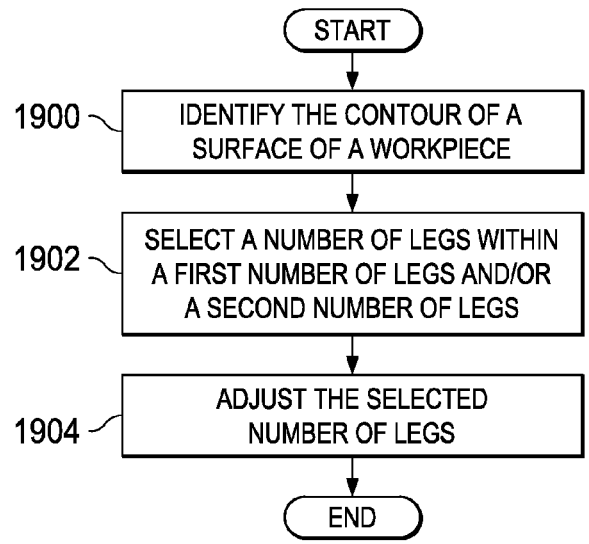
FIG. 19 is an illustration of a flowchart of a process for adjusting the legs of a crawler assembly system in accordance with an advantageous embodiment.

With reference now to FIG. 19, an illustration of a flowchart of a process for adjusting the legs of a crawler assembly system is depicted in accordance with an advantageous embodiment. The process illustrated in FIG. 19 may be implemented using crawler assembly system 402 in FIG. 4.

The process may begin by identifying the contour of surface 440 of workpiece 406 (operation 1900). For example, without limitation, in operation 1900, the contour may be identified as curved, jagged, straight, and/or having some other type of contour. Additionally, the contour may be identified as a complex contour in which the contour is curved in at least two directions.

Thereafter, the process may select a number of legs within first number of legs 426 and/or second number of legs 428 (operation 1902). The process may then adjust the selected number of legs (operation 1904), with the process terminating thereafter.

In operation 1904, the selected number of legs may be adjusted by moving at least a portion of the selected number of legs vertically to adjust for the contour of surface 440. Further, the selected number of legs may be adjusted by tilting at least a portion of the selected number of legs in second number of legs 428 relative to surface 440. Tilting of this portion of the selected number of legs may allow electromagnetic unit 412 to be tilted such that electromagnetic unit 412 may attach to surface 440.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, in some advantageous embodiments, operation 1706 may be performed while operation 1704 is being performed. In other words, the determination as to whether to move crawler assembly system 402 to another location may be made while operation 1704 is being performed. Further, if another location is present for processing, operations 1700 and 1702 may also be performed while operation 1704 is being performed.

Thus, the different advantageous embodiments provide a method and apparatus for performing operations on a workpiece. In one advantageous embodiment, an apparatus may comprise a frame system, a first number of suction cups, a second number of suction cups, and a controller. The frame system may have a first frame and a second frame in which the frame system may be configured to hold an end effector. The end effector may be configured to perform a number of operations. The first number of suction cups may be associated with the first frame in which the first number of suction cups is configured for attachment to a workpiece.

The second number of suction cups may be associated with the second frame in which the second number of suction cups may be configured for attachment to a workpiece. The controller may be configured to control an application of a vacuum and a pressure by the first number of suction cups and the second number of suction cups during movement of the first frame and the second frame relative to each other on the workpiece.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a frame system having a first frame and a second frame in which the frame system is configured to hold an end effector that is configured to perform at least one operation in which the first frame is configured for attachment to a workpiece and in which the second frame is configured for attachment to the workpiece;
a controller configured to control attachment of the first frame and the second frame to the workpiece by applying a vacuum and a pressure during movement of the frame system;
an electromagnetic unit associated with the first frame, the electromagnetic unit configured to attract a magnetic material associated with the workpiece such that the electromagnetic unit engages the workpiece and holds the first frame on the workpiece, a channel extending through the electromagnetic unit configured to receive the end effector and allow the end effector to reach a surface of the workpiece when the electromagnetic unit engages the workpiece; a first number of suction cups associated with the first frame in which the first number of suction cups is configured for attachment to the workpiece; and
a second number of suction cups associated with the second frame in which the second number of suction cups is configured for the attachment to the workpiece;
wherein the controller is configured to control an application of the vacuum and the pressure by the first number of suction cups and the second number of suction cups during the movement of the frame system, the application of pressure including application of a cushion of air configured to lift the first number of suction cups and the second number of suction cups off the surface of the workpiece so as to enable movement of the first flame and the second frame.

2. The apparatus of claim 1, wherein the first frame and the second frame are configured to move relative to each other on the workpiece.

3. The apparatus of claim 1, wherein a number of legs connect the first number of suction cups to the first frame and wherein movement of a first portion of the number of legs in a first direction and movement of a second portion of the number of legs in a second direction, while the vacuum is applied to a first portion of the first number of suction cups connected to the first portion of the number of legs and to a second portion of the first number of suction cups connected to the second portion of the number of legs and the pressure is applied to the second number of suction cups, causes the frame system to turn on a surface of the workpiece.

4. The apparatus of claim 3 further comprising:
a first leg in the first portion of the number of legs, wherein the first leg is configured to rotate about a first axis in the first direction, the first leg associated with a single suction cup; and
a second leg in the second portion of the number of legs, wherein the second leg is configured to rotate about the first axis in the second direction, the second leg associated with a single suction cup, wherein rotation of the first leg in the first direction and the second leg in the second direction about the first axis causes rotation of the frame system about a second axis that is substantially perpendicular to the surface of the workpiece;
the first leg and the second leg also configured to move in a substantially normal direction with respect to the surface of the workpiece.

5. The apparatus of claim 1, wherein the end effector extends to a surface of the workpiece and is configured to perform one of drilling and fastening.

6. The apparatus of claim 1, wherein the channel is configured to receive an end of the end effector and allow the end of the end effector to reach the surface of the workpiece.

7. The apparatus of claim 1 further comprising:
a vacuum and pressure unit connected to a first number of suction cups and a second number of suction cups, wherein the vacuum and pressure unit is configured to apply both the vacuum and the pressure to the first number of suction cups and the second number of suction cups.

8. The apparatus of claim 1, wherein the frame system further comprises:
a movement system configured to move the first frame and the second frame relative to each other.

9. The apparatus of claim 1, wherein the frame system comprises:
a first number of legs connecting a first number of suction cups to the first frame; and
a second number of legs connecting a second number of suction cups to the second frame.

10. The apparatus of claim 9, wherein a movement system is configured to move the first number of legs and the second number of legs to conform to a surface of the workpiece while the end effector is performing the number of operations on the workpiece.

11. The apparatus of claim 1, wherein the controller is configured to apply the vacuum to a first number of suction cups to cause the vacuum to be present in each of the first number of suction cups and the pressure to a second number of suction cups to pressurize each suction cup in the second number of suction cups; move the second frame relative to the first frame while the vacuum present in the each suction cup in the second number of suction cups holds the first frame to the workpiece; apply the vacuum to the second number of suction cups to cause the vacuum to be present in each of the second number of suction cups after movement of the second frame; apply the pressure to the first number of suction cups to pressurize the each suction cup in the first number of suction cups after the vacuum is applied to the second number of suction cups; move the first frame relative to the second frame while the vacuum present in the each suction cup in the second number of suction cups holds the second frame to the workpiece.

12. The apparatus of claim 11 further comprising:
an electromagnetic unit associated with the first frame, wherein the electromagnetic unit is configured to attract a magnetic material associated with the workpiece such that the electromagnetic unit holds the first frame on the workpiece during the movement of the second frame.

13. The apparatus of claim 11, wherein the application of the pressure by the first number of suction cups and the second number of suction cups provides a force to lift.

14. The apparatus of claim 1 further comprising:
the end effector.

15. The apparatus of claim 14, wherein the end effector comprises at least one of a drill unit, a fastener system, a sealant unit, and a vision system.

16. A crawler assembly system comprising:
an end effector;
a frame system configured to hold the end effector that is configured to perform a number of operations including at least one of drilling and fastening on a workpiece in which the frame system comprises:
a first frame;
a second frame in which the first frame and the second frame are configured to move relative to each other on the workpiece;
a first number of legs in which a first leg in a first portion of the first number of legs is configured to rotate about a first axis in a first direction, in which a second leg in a second portion of the first number of legs is configured to rotate about the first axis in a second direction, and in which rotation of the first leg in the first direction and the second leg in the second direction about the first axis causes rotation of the frame system about a second axis that is substantially perpendicular to a surface of the workpiece;
a second number of legs; and
a movement system configured to move the first frame and the second frame relative to the each other and to move the first number of legs and the second number of legs to conform to the surface of the workpiece while the end effector is performing the number of operations on the workpiece;
a first number of suction cups connected to the first frame by the first number of legs in which the first number of suction cups is configured for attachment to the workpiece and in which a first portion of the first number of suction cups is connected to the first portion of the first number of legs and a second portion of the first number of suction cups is connected to the second portion of the first number of legs;
a second number of suction cups connected to the second frame by the second number of legs in which the second number of suction cups is configured for the attachment to the workpiece;
a controller configured to control an application of a vacuum and a pressure by the first number of suction cups and the second number of suction cups during movement of the frame system in which movement of the first portion of the first number of legs in the first direction and movement of the second portion of the first number of legs in the second direction, while the vacuum is applied to the first portion of the first number of suction cups and to a second portion of the second number of suction cups and the pressure is applied to the second number of suction cups, causes the frame system to turn on the surface of the workpiece, the application of pressure including application of a cushion of air configured to lift the first number of suction cups and the second number of suction cups off the surface of the workpiece so as to enable movement of the first frame and the second frame;

an electromagnetic unit associated with the first frame in which the electromagnetic unit is configured to attract a magnetic material associated with the workpiece such that the electromagnetic unit holds the first frame on the workpiece and in which a channel extends through the electromagnetic unit and is configured to receive an end of the end effector and allow the end of the end effector to reach the surface of the workpiece, the electromagnet configured to stabilize the end effector when the electromagnet is engaged with the workpiece;

a vacuum and pressure unit connected to the first number of suction cups and the second number of suction cups in which the vacuum and pressure unit is configured to apply at least one of the vacuum and the pressure to the first number of suction cups and the second number of suction cups;

the end effector in which the end effector comprises at least one of a drill unit, a fastener system, a sealant unit, and a vision system; and a sensor system in communication with the controller, the sensor system configured to determine a location of the crawler assembly where the end effector performs the at least one operation.

17. The crawler assembly system of claim 14, wherein the controller is configured to apply the vacuum to the first number of suction cups and the pressure to the second number of suction cups; move the second frame relative to the first frame while the second number of suction cups holds the first frame to the workpiece; apply the vacuum to the second number of suction cups after movement of the second frame; apply the pressure to the first number of suction cups after the vacuum is applied to the second number of suction cups; and move the first frame relative to the second frame while the second number of suction cups holds the second frame to the workpiece.

18. A crawler assembly for performing an operation on a workpiece having a curved surface comprising:

an end effector configured to perform at least one of drilling or fastening;

a first frame;

a second frame located inside of the first frame, the end effector attached to the second frame, the first frame is configured for attachment to a workpiece and the second frame configured for attachment to the workpiece;

a controller configured to control attachment of the first frame and the second frame to the workpiece by applying a vacuum and a pressure during movement of the first frame and the second frame;

an electromagnetic unit associated with the second frame, the electromagnetic unit configured to attract a magnetic material associated with the workpiece such that the electromagnetic unit engages the workpiece and holds the first frame on the workpiece, a channel extending through the electromagnetic unit configured to receive the end effector and allow the end effector to reach a surface of the workpiece when the electromagnetic unit engages the workpiece; and a sensor system associated with the controller and configured to determine a location of the crawler assembly where the end effector performs the at least one operation and to inspect the location; a first number of suction cups associated with the first frame in which the first number of suction cups is configured for attachment to the workpiece; and a second number of suction cups associated with the second frame in which the second number of suction cups is configured for the attachment to the workpiece;

wherein the controller is configured to control an application of the vacuum and the pressure by the first number of suction cups and the second number of suction cups during the movement of the frame system, the application of pressure including application of a cushion of air configured to lift the first number of suction cups and the second number of suction cups off the surface of the workpiece so as to enable movement of the first flame and the second frame.

* * * * *